United States Patent
Kamiya et al.

(10) Patent No.: US 11,299,171 B2
(45) Date of Patent: Apr. 12, 2022

(54) DRIVING SUPPORT CONTROL DEVICE OF VEHICLE, DRIVING SUPPORT SYSTEM OF VEHICLE, AND DRIVING SUPPORT CONTROL METHOD OF VEHICLE

(71) Applicant: DENSO CORPORATION, Kariya (JP)

(72) Inventors: Kei Kamiya, Kariya (JP); Atsushi Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/012,045

(22) Filed: Sep. 4, 2020

(65) Prior Publication Data
US 2020/0398858 A1 Dec. 24, 2020

Related U.S. Application Data

(63) Continuation of application No. PCT/JP2018/048223, filed on Dec. 27, 2018.

(30) Foreign Application Priority Data

Mar. 9, 2018 (JP) .............................. JP2018-043303

(51) Int. Cl.
*B60W 50/029* (2012.01)
*B60W 40/114* (2012.01)
(Continued)

(52) U.S. Cl.
CPC ........ *B60W 50/029* (2013.01); *B60W 40/114* (2013.01); *B60W 50/035* (2013.01);
(Continued)

(58) Field of Classification Search
CPC ............. B60W 50/029; B60W 40/114; B60W 50/035; B60W 50/045; B60W 2050/0215; B60W 2050/0292; B60W 50/0205; B60W 30/0953; B60W 30/09; G06K 9/00791; G08G 1/167; G08G 1/166
(Continued)

(56) References Cited

U.S. PATENT DOCUMENTS

2001/0025210 A1* 9/2001 Tozu ........................ B60T 8/172
701/1
2003/0074123 A1* 4/2003 Kin ........................ G05D 1/0891
701/70
(Continued)

FOREIGN PATENT DOCUMENTS

| JP | 2006-168506 | * | 6/2006 |
| JP | 2006-168506 A | | 6/2006 |
| JP | 2011-121548 A | | 6/2011 |

*Primary Examiner* — Muhammad Shafi
(74) *Attorney, Agent, or Firm* — Maschoff Brennan

(57) ABSTRACT

A driving support control device of a vehicle is provided including an acquiring unit configured to acquire a traveling state of the vehicle which is detected and a traveling environment of the vehicle, and a control unit, configured to, in a case where zero-point learning of a yaw rate sensor has not been completed, cause a driving support unit to execute collision avoidance support using a reduced operational area reduced from a reference operational area which becomes a reference in view of an error of the yaw rate sensor as an operational area of collision avoidance support, and the traveling state of the vehicle and the traveling environment of the vehicle.

5 Claims, 5 Drawing Sheets

(51) Int. Cl.
*B60W 50/035* (2012.01)
*B60W 50/04* (2006.01)
*B60W 50/02* (2012.01)

(52) U.S. Cl.
CPC ... *B60W 50/045* (2013.01); *B60W 2050/0215* (2013.01); *B60W 2050/0292* (2013.01)

(58) Field of Classification Search
USPC .......................................................... 701/29.7
See application file for complete search history.

(56) References Cited

U.S. PATENT DOCUMENTS

| | | | |
|---|---|---|---|
| 2003/0074127 A1* | 4/2003 | Kin | B60T 8/172 701/80 |
| 2003/0109939 A1* | 6/2003 | Burgdorf | G01D 3/0365 700/38 |
| 2004/0030497 A1* | 2/2004 | Knoop | B60T 7/042 701/301 |
| 2011/0295549 A1* | 12/2011 | Takabayashi | G01S 7/4004 702/142 |
| 2014/0136053 A1* | 5/2014 | Watanabe | B62D 15/0245 701/41 |
| 2014/0142810 A1* | 5/2014 | Watanabe | B62D 15/0245 701/41 |
| 2014/0297170 A1 | 10/2014 | Sakima et al. | |
| 2015/0120134 A1* | 4/2015 | Kanou | B62D 15/0245 701/34.4 |

\* cited by examiner

DRIVING SUPPORT CONTROL DEVICE OF VEHICLE, DRIVING SUPPORT SYSTEM OF VEHICLE, AND DRIVING SUPPORT CONTROL METHOD OF VEHICLE

CROSS-REFERENCE TO RELATED APPLICATION

This application is the U.S. bypass application of International Application No. PCT/JP2018/048223 filed Dec. 27, 2018 which designated the U.S. and claims priority to Japanese Patent Application No. 2018-043303, filed Mar. 9, 2018, the contents of which are incorporated herein by reference.

BACKGROUND

Technical Field

The present disclosure relates to a technique for controlling driving support of a vehicle to suppress or avoid a collision with an object.

Description of the Related Art

In a driving support technique for suppressing or avoiding a collision with an object, a rotational angular velocity output from a yaw rate sensor is used as one of parameters indicating a traveling state of an own vehicle. The yaw rate sensor typically involves a detection error, and calibration processing for causing the yaw rate sensor to learn a zero point, that is, zero-point learning processing is performed upon use.

SUMMARY

The present disclosure provides a driving support control device of a vehicle including an acquiring unit configured to acquire a traveling state of the vehicle which is detected and a traveling environment of the vehicle, and a control unit configured to, in a case where zero-point learning of a yaw rate sensor has not been completed, cause a driving support unit to execute collision avoidance support using a reduced operational area reduced from a reference operational area which becomes a reference in view of an error of the yaw rate sensor as an operational area of collision avoidance support, and the traveling state of the vehicle and the traveling environment of the vehicle.

DETAILED DESCRIPTION OF THE PREFERRED EMBODIMENTS

As a conventional art, for example, JP 2014-191597 A discloses a driving support apparatus. In a driving support technique for suppressing or avoiding a collision with an object, a rotational angular velocity output from a yaw rate sensor is used as one of parameters indicating a traveling state of an own vehicle. The yaw rate sensor typically involves a detection error, and calibration processing for causing the yaw rate sensor to learn a zero point, that is, zero-point learning processing is performed upon use. If traveling of a vehicle is started in a state where the calibration processing has not been completed, there is a case where, as a result of a target which should not be made a target for driving support being unable to be accurately identified due to a detection error, driving support may be executed on a target which is not required to be a target for which driving support is to be executed.

Therefore, it is desired that driving support is appropriately executed even if zero-point learning processing of the yaw rate sensor has not been completed.

With reference to the drawings, a driving support control device of a vehicle, a driving support system of a vehicle, and a driving support control method of a vehicle according to the present disclosure will be described below on the basis of some embodiments.

First Embodiment

Figure 1:
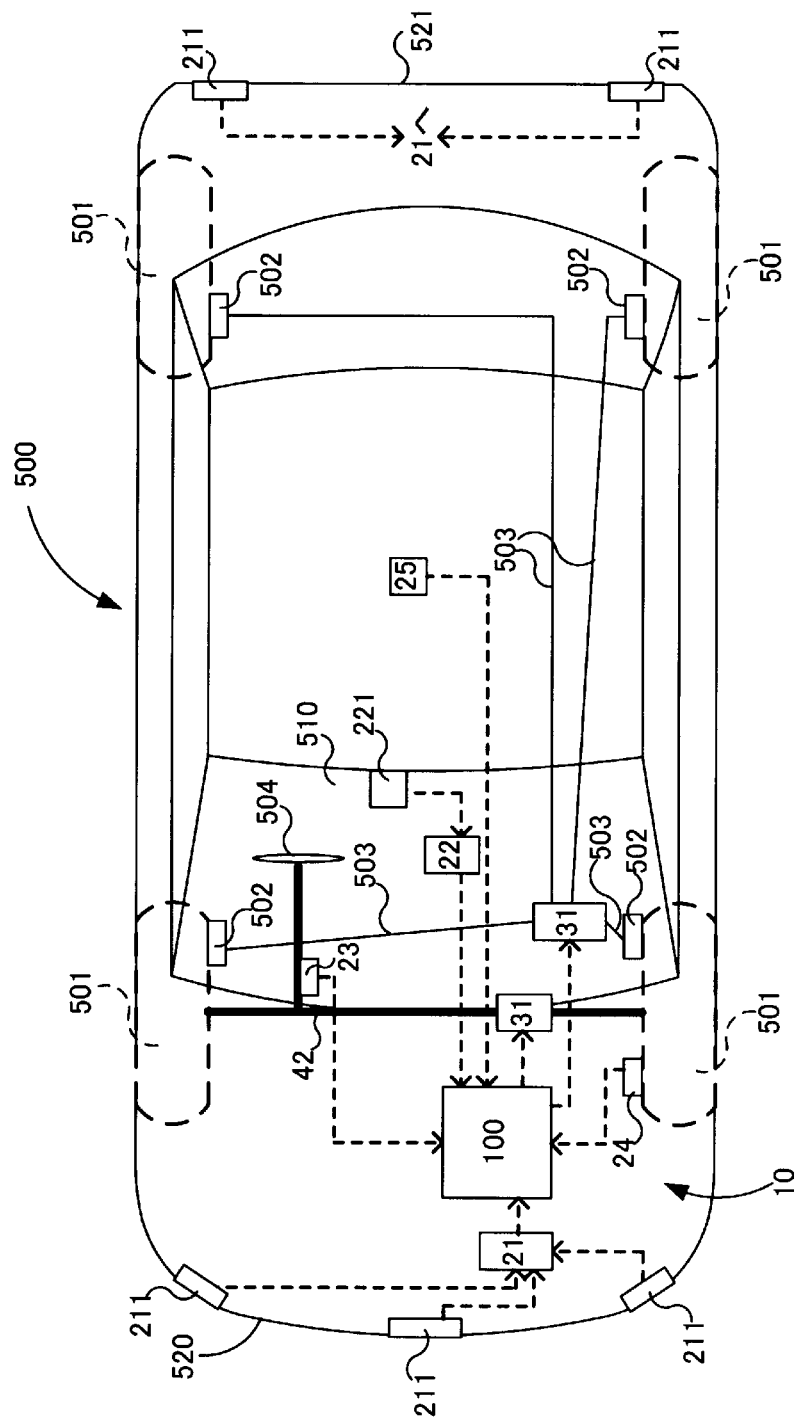
FIG. 1 is an explanatory diagram illustrating an example of a vehicle on which a driving support control device according to a first embodiment is mounted.

As illustrated in FIG. 1, a driving support control device 100 of a vehicle according to a first embodiment is used mounted on a vehicle 500. The driving support control device 100 only requires to include at least a control unit and an acquiring unit, and a driving support system 10 includes a radar ECU 21, a camera ECU 22, a rotational angle sensor 23, wheel speed sensors 24, a yaw rate sensor 25, and driving support devices 31 in addition to the driving support control device 100. The vehicle 500 includes wheels 501, braking devices 502, braking lines 503, a steering wheel 504, a windshield 510, a front bumper 520 and a rear bumper 521. The radar ECU 21 is connected to millimeter wave radars 211 which emit radio waves and detect reflected waves from a target, and generates and outputs a detection signal indicating the target with reflection points using the reflected waves acquired by the millimeter wave radars 211. The camera ECU 22 is connected to a monocular camera 221, and generates and outputs a detection signal indicating a target with an image using an image acquired with the camera 221 and a shape pattern of a target prepared in advance. Each of the ECUs 21 and 22 is a microprocessor including a calculating unit, a storage unit and an input/output unit. A LIDAR (laser radar), or an ultrasonic detector which emits sound waves and detects reflected waves of the sound wave may be used as a detector which detects a reflected wave, other than the millimeter wave radars 211. A stereo camera or a multi-camera constituted with two or more cameras may be used as an imager which captures an image of a target, other than the monocular camera 221. Further, a rear camera and a lateral camera may be provided.

The braking devices 502 are provided at the respective wheels 501. Each braking device 502 is, for example, a disk brake or a drum brake, brakes each wheel 501 with braking force in accordance with a brake hydraulic pressure supplied via the braking line 503 in response to braking pedal operation by a driver, and realizes braking of the vehicle 500. The braking line 503 includes a brake piston and a brake fluid line which generate a brake hydraulic pressure in accordance with the braking pedal operation. Note that, as the braking line 503, it is also possible to employ a configuration where an actuator provided at each braking device 502 is actuated using a control signal line in place of the brake fluid line.

The steering wheel 504 is connected to front wheels 501 via a steering gear 42 including a steering rod, a steering mechanism and a steering shaft. A steering force assist device for reducing steering force may be provided at the steering gear 42.

The driving support device 31, which is a driving support unit, is provided at the braking line 503, and includes a braking support device which can be controlled with a hydraulic pressure by an actuator, for example, an electric motor, independently from braking pedal operation, a steering support device which can drive the steering gear 42 by an actuator, for example, an electric motor, and an output control device for controlling output of an internal combustion engine or an electric motor which is a motive power source. Braking support, steering support and collision avoidance support in accordance with detection results by the millimeter wave radars 211 and the camera 221 are realized by the driving support devices 31.

Figure 2:
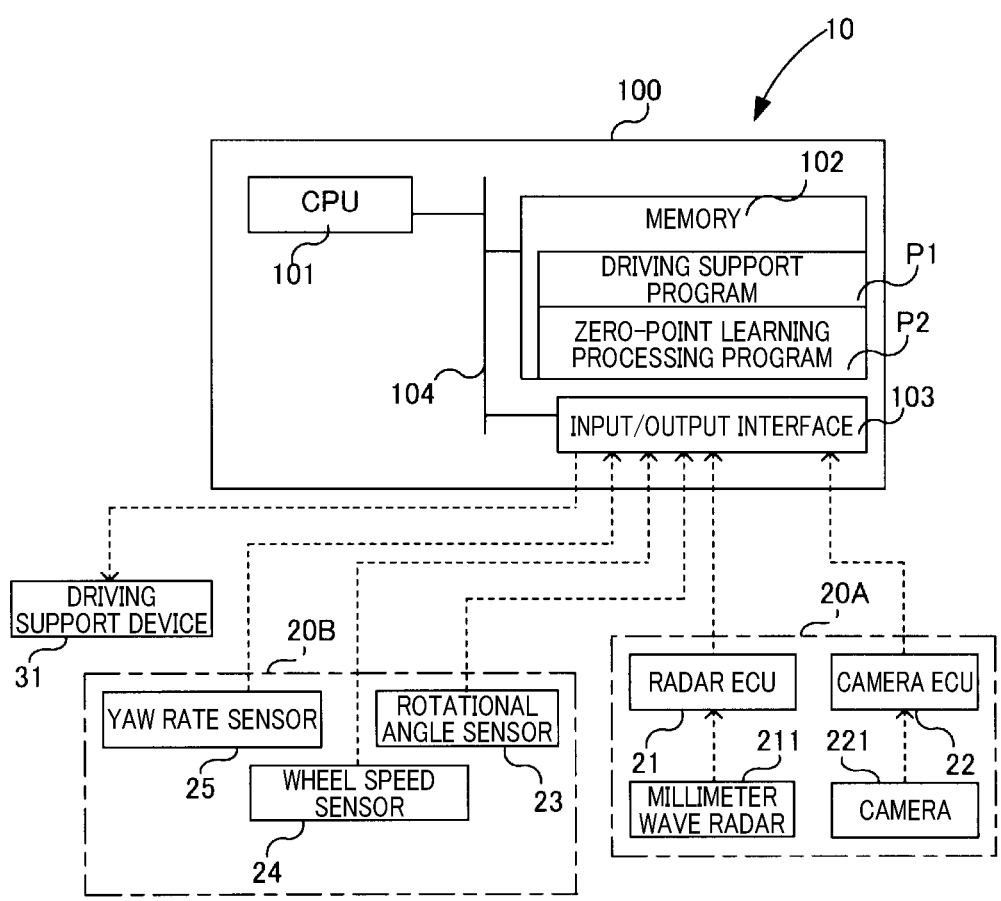
FIG. 2 is a block diagram illustrating a functional configuration of the driving support control device according to the first embodiment.

As illustrated in FIG. 2, the driving support control device 100 includes a central processing unit (CPU) 101 and a memory 102 as a control unit, an input/output interface 103 as an acquiring unit, and a bus 104. The CPU 101, the memory 102 and the input/output interface 103 are connected via the bus 104 so as to be able to perform bidirectional communication. The memory 102 includes a memory which stores a driving support program P1 for executing driving support, and a zero-point learning processing program P2 for executing zero-point learning processing of the yaw rate sensor 25, in a non-volatile manner and in a read-only manner, which is, for example, a ROM, and a memory which is readable and writable by the CPU 101, which is, for example, a RAM. The CPU 101 sets an operational area of collision avoidance support to be one of a reference operational area which is a reference and a reduced operational area reduced from the reference operational area by deploying the driving support program P1 stored in the memory 102 to a readable and writable memory and executing the driving support program P1, and realizes a function as a control unit which executes collision avoidance support processing by controlling the driving support devices 31. Further, the CPU 101 executes zero-point learning processing of the yaw rate sensor 25 by deploying the zero-point learning processing program P2 stored in the memory 102 to a readable and writable memory and executing the zero-point learning processing program P2. Note that the CPU 101 may be a single CPU, may be a plurality of CPUs which execute the respective programs, or may be a multi-core type CPU which can execute a plurality of programs at the same time.

To the input/output interface 103, the radar ECU 21, the camera ECU 22, the rotational angle sensor 23, the wheel speed sensors 24, the yaw rate sensor 25 and the driving support devices 31 are connected respectively via control signal lines. Detection signals are input from the radar ECU 21, the camera ECU 22, the rotational angle sensor 23, the wheel speed sensors 24, and the yaw rate sensor 25. Control signals which give instructions regarding operation states of a vehicle such as a braking level and a steering angle are output to the driving support devices 31. Therefore, the input/output interface 103 functions as an acquiring unit for acquiring a traveling state of an own vehicle and a traveling environment around the own vehicle detected by various kinds of sensors. Note that the radar ECU 21, the millimeter wave radars 211, the camera ECU 22 and the camera 221 function as a traveling environment detecting device 20A. The rotational angle sensor 23, the wheel speed sensor 24 and the yaw rate sensor 25 function as a traveling state detecting device 20B. The traveling environment detecting device 20A and the traveling state detecting device 20B can be referred to as a detecting unit.

The millimeter wave radars 211 are sensors which detect distances, relative speed and angles of a target by emitting millimeter waves and receiving reflected waves reflected by the target. In the present embodiment, the millimeter wave radars 211 are disposed at a central and both side surfaces of the front bumper 520 and both side surfaces of the rear bumper 521. Unprocessed detection signals output from the millimeter wave radars 211 are processed at the radar ECU 21, and input to the driving support control device 100 as detection signals including points or a sequence of points indicating one or a plurality of representative positions of the target. Alternatively, signals indicating unprocessed received waves may be input to the driving support control device 100 from the millimeter wave radars 211 without the radar ECU 21 being provided. In a case where unprocessed received waves are used as detection signals, signal processing for specifying a position and a distance of the target is executed at the driving support control device 100.

The camera 221 is an imaging device which includes one imaging element such as a CCD, and is a sensor which outputs outline information of an object as image data which is a detection result by receiving visible light. The image data output from the camera 221 is subjected to feature point extraction processing at the camera ECU 22, a pattern indicated with the extracted feature points is compared with a comparative pattern indicating an object to be discerned, that is, outline of a vehicle, which is prepared in advance, and, in a case where the extracted pattern matches or is similar to the comparative pattern, a frame image including the discerned object is generated. Meanwhile, in a case where the extracted pattern does not match or is not similar to the comparative pattern, that is, in a case of a dissimilar pattern, a frame image is not generated. In the camera ECU 22, in a case where image data includes a plurality of objects, a plurality of frame images including respective discerned objects are generated, and input to the driving support control device 100 as detection signals. Each frame image is expressed with pixel data, and includes position information, that is coordinate information of the discerned object. The number of frame images included in the detection signals depends on a band width between the camera ECU 22 and the driving support control device 100. Unprocessed image data captured with the camera 221 may be input to the driving support control device 100 as detection signals without the camera ECU 22 being separately provided. In this case, a target may be discerned using an outline pattern of an object to be discerned at the driving support control device 100. In the present embodiment, the camera 221 is disposed at the center of an upper portion of the windshield 510. The pixel data output from the camera 221 is black-and-white pixel data or color pixel data. Note that, in a case where an object other than a vehicle, for example, a traffic light, road marking such as a lane and a stop line, or the like, are desired as an object to be discerned, an outline pattern of a desired object may be prepared, and the camera ECU 22 may output a frame image including the desired object as a detection signal. In this case, it is only necessary that a frame image appropriate for processing is selectively used in processing in a post stage at the driving support control device 100. This will similarly apply to a case where a rear camera is provided.

The rotational angle sensor 23, which is a torque sensor detecting an amount of twist occurring at a steering rod by steering of the steering wheel 504, that is, steering torque, detects a steering angle of the steering wheel 504. In the present embodiment, the rotational angle sensor 23 is provided at the steering rod which connects the steering wheel 504 and the steering mechanism. A detection signal output from the rotational angle sensor 23 is a voltage value proportional to an amount of twist.

The wheel speed sensors 24, which are sensors detecting rotational speed of the wheels 501, are provided at the respective wheels 501. Detection signals output from the wheel speed sensors 24 are pulse waves indicating voltage values proportional to the wheel speed or intervals in accordance with the wheel speed. It is possible to obtain information such as vehicle speed and a traveling distance of the vehicle by using the detection signals from the wheel speed sensors 24.

The yaw rate sensor 25 is a sensor which detects rotational angular velocity of the vehicle 500. The yaw rate sensor 25 is, for example, disposed at a central portion of the vehicle. A detection signal output from the yaw rate sensor 25 is a voltage value proportional to a rotational direction and angular velocity, and a voltage value indicating lane change or turning right or left of the vehicle 500 can be detected.

Figure 3:
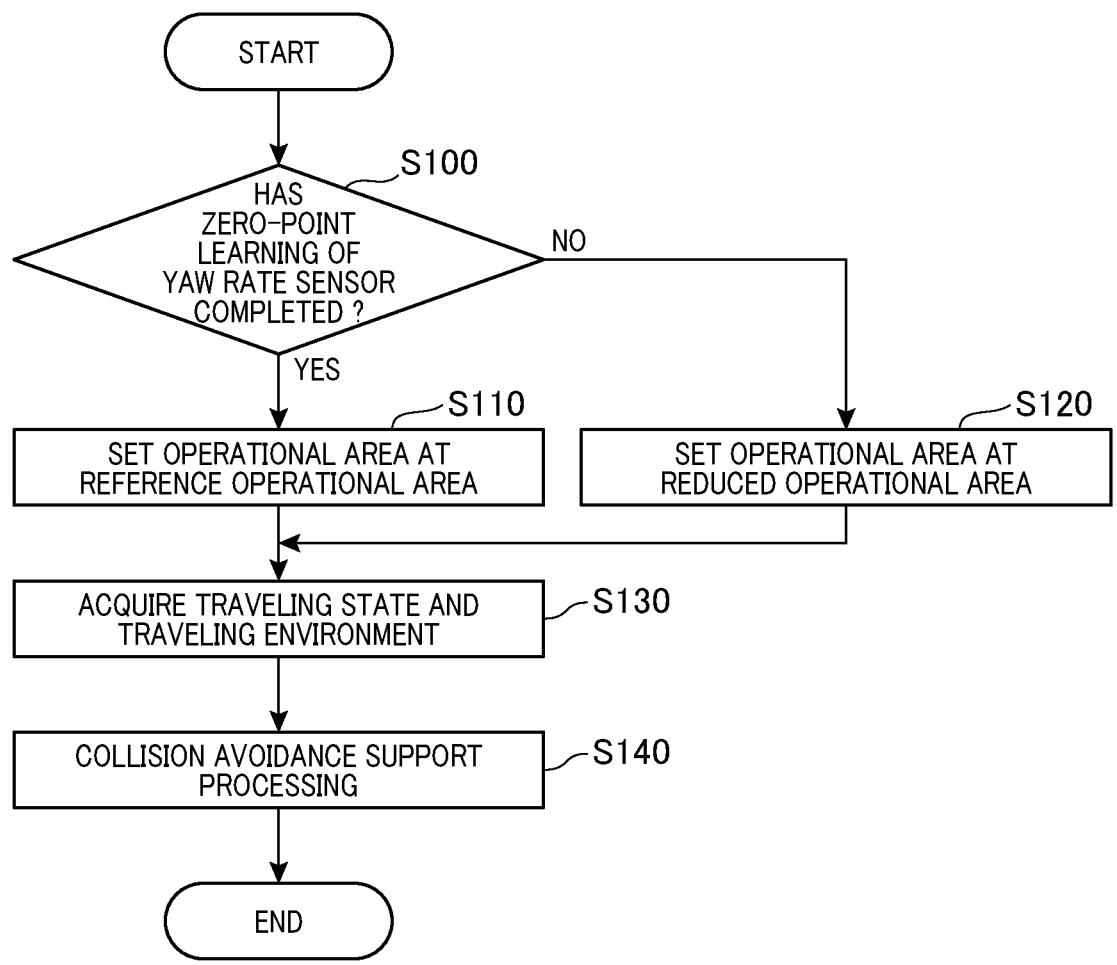
FIG. 3 is a flowchart illustrating processing flow of driving support processing to be executed by the driving support control device according to the first embodiment.

Driving support processing to be executed by the driving support control device 100 according to the first embodiment will be described. Processing routine illustrated in FIG. 3 is repeatedly executed at predetermined time intervals, for example, from when a vehicle control system is started until when the vehicle control system is stopped, or from when a start switch is turned on until when the start switch is turned off. The driving support processing in the present embodiment includes, for example, braking support processing and steering support processing. The braking support processing includes sudden braking and gentle braking for avoiding a collision with a target vehicle, and the steering support processing includes steering for avoiding a collision with a target vehicle, and steering for preventing a vehicle from deviating from a lane.

The CPU 101 determines whether zero-point learning processing of the yaw rate sensor 25 has been completed (step S100). Because the yaw rate sensor 25 involves an error as tolerance or allowable tolerance, the CPU 101, for example, executes the zero-point learning processing program P2 upon start of the vehicle 500 separately from the present processing routine, and if the zero-point learning processing is completed, for example, sets a zero-point learning completion flag on. The zero-point learning processing is executed by, for example, obtaining a correction value for making rotational angular velocity to be output during the zero-point learning processing zero. The yaw rate sensor 25 corrects a detection value using the obtained correction value and outputs the corrected detection value to the driving support control device 100. Note that the zero-point learning processing may be executed for a plurality of times at arbitrary timings while the vehicle 500 is traveling to improve learning accuracy, and an average value of the plurality of times may be learned as a zero point, that is, may be set as the correction value.

Figure 4:
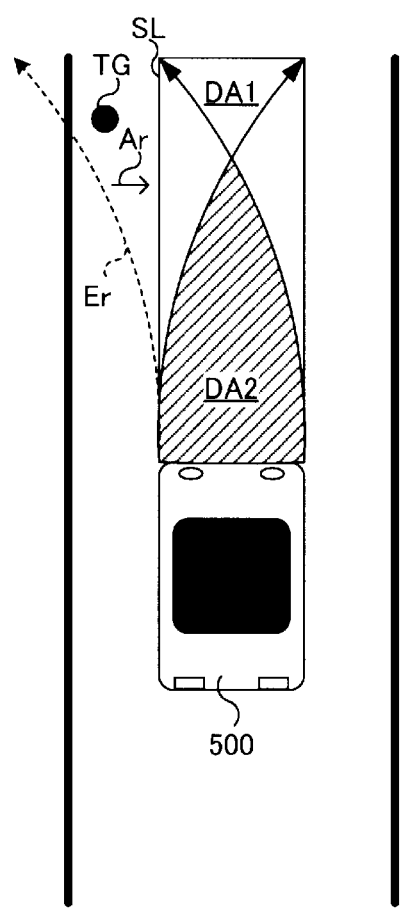
FIG. 4 is an explanatory diagram illustrating a reference operational area and a reduced operational area.

When the zero-point learning completion flag is set on, and it is determined that the zero-point learning processing of the yaw rate sensor 25 has been completed (step S100: Yes), the CPU 101 sets an operational area at a reference operational area (step S110). The operational area is an area determined in advance for specifying a target which should be made a target for driving support including collision avoidance support, and the target included within the operational area is specified as the target which becomes a target of driving support. As illustrated in FIG. 4, the reference operational area DA1 is an area defined with a line extending forward from both end portions of the vehicle 500 in a width direction thereof and, for example, is an area which is determined in advance for specifying a target when the vehicle 500 goes straight and which become a reference of the operational area. Note that a width and a forward length of the reference operational area DA1 may be variable in accordance with vehicle speed or a turning state of the vehicle 500. For example, the forward length may be set longer in a case where the vehicle speed is higher, and may be set shorter in a case where the vehicle speed is lower, and the width may be set narrower as a steering angle becomes greater.

The CPU 101 sets the operational area at a reduced operational area (step S120) when the zero-point learning completion flag is set off, and it is determined that zero-point learning processing of the yaw rate sensor 25 has not been completed (step S100: No). As illustrated in FIG. 4, the reduced operational area DA2 is determined in view of an error, more preferably, a maximum error of the yaw rate sensor 25, and has a width which becomes shorter with respect to the reference operational area DA1 as the reduced operational area DA2 is separated from the vehicle 500. The reduced operational area DA2 is, for example, set as follows. The reduced operational area DA2 may be calculated and set every time step S120 is executed in accordance with the following procedure or a plurality of reduced operational areas DA2 may be prepared in advance at predetermined speed intervals using a maximum error, and an appropriate reduced operational area DA2 may be selected and set using speed of an own vehicle upon execution of step S120.

Figure 5:
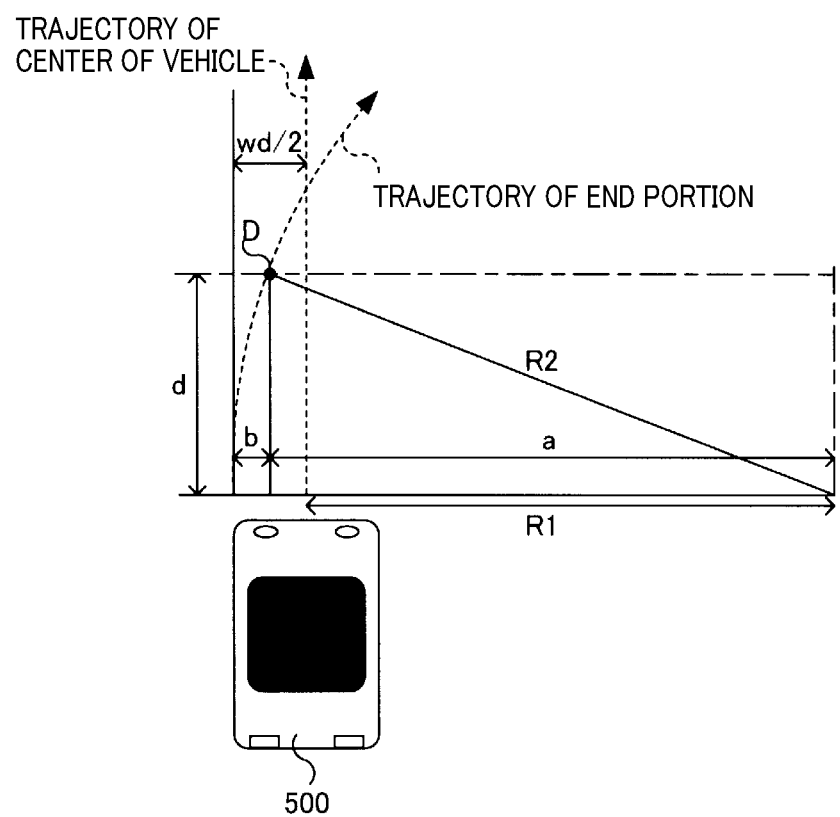
FIG. 5 is an explanatory diagram illustrating a procedure of calculating the reduced operational area.

Description will be provided with reference to FIG. 5. If an error of the yaw rate sensor 25 is set as ω (rad/s), and speed of the own vehicle is set as V (m/s), an estimated curvature radius R1 of the vehicle 500 is calculated using the following equation using the rotational angular velocity output from the yaw rate sensor 25 when the vehicle 500 goes straight.

$$R1(m)=V(m/s)/\omega(rad/s)$$

Because a dimension of the reduced operational area DA2 in a width direction of the vehicle 500 is reduced with respect to the reference operational area DA1, a second movement trajectory traced by an end portion of the vehicle 500 in the width direction is used. The second movement trajectory can be expressed with an arc having an end portion radius R2 indicated below in a case where the width of the own vehicle is set as wd (m).

$$R2=(wd/2)+R1$$

A lateral position at a position D separated from the vehicle 500 by a distance d (m), that is, a reduction value b (m) in the width direction of the vehicle 500 can be calculated from the following equation using a distance a (m) in a lateral direction from a center of the estimated curvature radius R1 at the position D.

$$b=(wd/2)-(R2-a)$$

The distance a in the lateral direction can be expressed as follows using the end portion radius R2 and the distance d.

$$a=(R2-d2)1/2$$

Therefore, the reduction value b can be obtained from b=(wd/2)−(R−(R2−d2)1/2). Note that, while description is provided using an example of a left end portion of the vehicle 500 in FIG. 5, description is similar for a right end portion of the vehicle 500. By obtaining the reduction value b until the reduction value becomes b>wd in accordance with the distance d from the vehicle 500 for the left and right end portions, it is possible to define the reduced operational area DA2 illustrated in FIG. 4. Note that while, in the above description, description has been provided using a distance in the lateral direction to simplify the description, when the reduced operational area DA2 is calculated and defined, an x coordinate value at each y coordinate is calculated using a coordinate value (x, y) where y is a longitudinal direction (traveling direction of the vehicle) perpendicular to the lateral direction and x is the lateral direction.

The CPU 101 acquires a traveling environment from the traveling environment detecting device 20A via the input/output interface 103 as the acquiring unit and acquires a traveling state from the traveling state detecting device 20B (step S130). The traveling environment means a state and conditions of surrounding, that is, an outside world of the own vehicle, and, for example, includes information such as a position, speed, a shape and a state of a target in front of, behind, left and right of the own vehicle. Examples of the target can include, for example, other vehicles, roads, road marking and road signs. The traveling state of the vehicle is information regarding the own vehicle, and includes, for example, speed of the vehicle 500, a direction of the vehicle 500 and rotational angular velocity of the vehicle 500.

The CPU 101 executes collision avoidance support processing using the set operational area (step S140), and the present processing routine is finished. In the collision avoidance support processing, the CPU 101 specifies a target which becomes a target for collision avoidance support within the operational area using the traveling environment information, and executes driving support processing of calculating a control command value for executing at least one of braking support including sudden braking for which a braking level for collision avoidance is high and steering support including sudden steering for which a steering angle or steering speed is large using relationship of positions and relative speed between the specified target obtained from the traveling state information and the traveling environment information and the own vehicle. The CPU 101 transmits the calculated control command value to the driving support devices 31 and causes the driving support devices 31 to execute collision avoidance support as driving support.

As described above, according to the driving support control device 100 of the vehicle according to the first embodiment, in a case where zero-point learning processing of the yaw rate sensor 25 has not been completed, because driving support processing is executed using the reduced operational area DA2 as illustrated in FIG. 4, it is possible to suppress or prevent execution of unnecessary collision avoidance support due to an error of the yaw rate sensor 25. That is, at a time point at which the zero-point learning processing of the yaw rate sensor 25 has not been completed, an estimated traveling course Er which does not match an actual traveling course of the own vehicle is calculated due to a detection error of the yaw rate sensor 25. As a result, as illustrated in FIG. 4, in a case where the reference operational area DA1 is used, because even a target TG which does not exist on the actual traveling course is regarded as existing on the estimated traveling course, there is a case where the target TG is specified as the target for which collision avoidance support is to be performed, and driving support processing is executed. Meanwhile, if the reduced operational area DA2 is used, an error of the yaw rate sensor 25 is cancelled as indicated with an arrow Ar, and a boundary SL in a lateral direction of the operational area substantially matches a lateral position of the reference operational area DA1. As a result, the target TG which does not exist on the actual traveling course is not specified as the target for which collision avoidance support is to be performed, and execution of unnecessary driving support processing is suppressed or prevented, so that it is possible to reduce or eliminate a feeling of discomfort or a feeling of anxiety to be felt by passengers including a driver.

Other Embodiments (1) While, in the above-described embodiment, a control unit is realized with software by the CPU 101 executing the driving support program P1, the control unit may be realized with hardware using an integrated circuit programmed in advance or a discrete circuit.

While the present disclosure has been described above on the basis of the embodiment and the modified examples, the above-described embodiment is provided to facilitate understanding of the present disclosure and is not intended to limit the present disclosure. The present disclosure can be transformed and modified without deviating from the gist and the claims, and the present disclosure incorporates the equivalent. For example, technical features in the embodiment and the modified examples corresponding to technical features in the respective aspects described in summary of the invention can be replaced, or combined as appropriate to solve part or all of the above-described problems or to achieve part or all of the above-described effects. Further, if the technical features are not described as essential features in the present specification, the technical features can be deleted as appropriate. For example, when the driving support control device in the vehicle according to the above-described first aspect is set as Application Example 1, there are the following possible application examples:

Application Example 2: a driving support control device of a vehicle in which, in the driving support control device according to Application Example 1, the control unit reduces the reference operational area in view of a maximum error of the yaw rate sensor, and Application Example 3: a driving support control device of a vehicle in which, in the driving support control device of the vehicle according to Application Example 2, the control unit uses the reference operational area in a case where zero-point learning of the yaw rate sensor has been completed.

CONCLUSION

The present disclosure is realized as the following aspects.

According to a first aspect, a driving support control device of a vehicle is provided. The driving support control device of the vehicle according to the first aspect includes an acquiring unit configured to acquire a traveling state of the vehicle which is detected and a traveling environment of the vehicle, and a control unit configured to, in a case where zero-point learning of a yaw rate sensor has not been completed, cause a driving support unit to execute collision avoidance support using a reduced operational area reduced from a reference operational area which becomes a reference in view of an error of the yaw rate sensor as an operational area of collision avoidance support, and the traveling state of the vehicle and the traveling environment of the vehicle.

According to the driving support control device of the vehicle according to the first aspect, even if calibration processing of the yaw rate sensor has not been completed, it is possible to appropriately execute driving support.

According to a second aspect, a driving support system is provided. The driving support system according to the second aspect includes the driving support control device according to the first aspect, a detecting unit configured to detect the traveling state and the traveling environment, and the driving support unit configured to execute the collision avoidance support in accordance with an instruction from the control unit.

According to the driving support system according to the second aspect, even if calibration processing of the yaw rate sensor has not been completed, it is possible to appropriately execute driving support.

According to a third aspect, a driving support control method of a vehicle is provided. The driving support control method of the vehicle according to the third aspect includes acquiring a traveling state of the vehicle which is detected and a traveling environment of the vehicle, determining whether zero-point learning of a yaw rate sensor has been completed, and, in a case where the zero-point learning of the yaw rate sensor has not been completed, executing collision avoidance support processing using a reduced operational area reduced from a reference operational area which becomes a reference in view of an error of the yaw rate sensor as an operational area of collision avoidance support, and the traveling state of the vehicle and the traveling environment of the vehicle.

According to the driving support control method according to the third aspect, even if calibration processing of the yaw rate sensor has not been completed, it is possible to appropriately execute driving support. Note that the present disclosure can be also realized as a driving support control program of a vehicle or a computer-readable recording medium which records the program.

What is claimed is:

1. A driving support control device of a vehicle comprising:
    an acquiring unit configured to acquire a traveling state of the vehicle which is detected and a traveling environment of the vehicle; and
    a control unit configured to, for a state in which a zero-point learning of a yaw rate sensor has not been completed, cause a driving support unit to execute collision avoidance support using the traveling state of the vehicle, the traveling environment of the vehicle, and a reduced operational area,
    wherein
    the zero-point learning comprises a calibration process performed by the yaw rate sensor in which the zero point of the yaw rate sensor is determined, and
    the reduced operational area comprises an area that is reduced relative to a reference operational area, which becomes a reference in view of an error of the yaw rate sensor as an operational area of collision avoidance support.

2. The driving support control device of the vehicle according to claim 1,
    wherein the control unit reduces the reference operational area in view of a maximum error of the yaw rate sensor.

3. The driving support control device of the vehicle according to claim 1,
    wherein the control unit uses the reference operational area in a case where zero-point learning of the yaw rate sensor has been completed.

4. A driving support system comprising:
    a driving support control device of a vehicle including:
        an acquiring unit configured to acquire a traveling state of the vehicle which is detected and a traveling environment of the vehicle; and
        a control unit configured to, for a state in which a zero-point learning of a yaw rate sensor has not been completed, cause a driving support unit to execute collision avoidance support using the traveling state of the vehicle, the traveling environment of the vehicle, and a reduced operational area;
    a detecting unit configured to detect the traveling state and the traveling environment; and
    wherein
    the zero-point learning comprises a calibration process performed by the yaw rate sensor in which the zero point of the yaw rate sensor is determined,
    the reduced operational area comprises an area that is reduced relative to a reference operational area, which becomes a reference in view of an error of the yaw rate sensor as an operational area of collision avoidance support, and
    the driving support unit is configured to execute the collision avoidance support in accordance with an instruction from the control unit.

5. A driving support control method of a vehicle, comprising:
    acquiring a traveling state of the vehicle which is detected and a traveling environment of the vehicle;
    determining whether zero-point learning of a yaw rate sensor has been completed; and
    for a state in which a zero-point learning of the yaw rate sensor has not been completed, executing collision avoidance support processing using the traveling state of the vehicle, the traveling environment of the vehicle, and a reduced operational area,
    wherein
    the zero-point learning comprises a calibration process performed by the yaw rate sensor in which the zero point of the yaw rate sensor is determined, and
    the reduced operational area comprises an area that is reduced relative to a reference operational area, which becomes a reference in view of an error of the yaw rate sensor as an operational area of collision avoidance support.

* * * * *